United States Patent
Gauss

(10) Patent No.: US 7,877,953 B2
(45) Date of Patent: Feb. 1, 2011

(54) PROCESS FOR STICKING EDGING MATERIAL ONTO LIGHTWEIGHT BUILDING BOARDS AND A LIGHTWEIGHT BUILDING BOARD PRODUCED BY MEANS OF SAID PROCESS

(75) Inventor: Achim Gauss, Dornstetten/Hallwangen (DE)

(73) Assignee: Homag Holzbearbeitungssyteme AG, Schopfloch (DE)

( * ) Notice: Subject to any disclaimer, the term of this patent is extended or adjusted under 35 U.S.C. 154(b) by 33 days.

(21) Appl. No.: 12/037,451

(22) Filed: Feb. 26, 2008

(65) Prior Publication Data

US 2008/0202065 A1    Aug. 28, 2008

(30) Foreign Application Priority Data

Feb. 26, 2007    (EP) .................................. 07003881

(51) Int. Cl.
*E04C 2/34* (2006.01)
*B29C 65/00* (2006.01)
*B32B 23/02* (2006.01)

(52) U.S. Cl. .................. 52/745.19; 52/800.1; 52/802.1; 428/192; 156/45; 156/71

(58) Field of Classification Search .............. 52/717.05, 52/745.19, 745.21, 782.2, 796.1, 796.12, 52/799.1, 800.1, 802.1; 156/257, 264, 304.1, 156/45, 71; 428/192
See application file for complete search history.

(56) References Cited

U.S. PATENT DOCUMENTS

| | | | | |
|---|---|---|---|---|
| 1,492,588 A | * | 5/1924 | Utzman | ....................... 428/130 |
| 3,319,814 A | * | 5/1967 | Van Elten | .................... 414/415 |
| 4,378,405 A | * | 3/1983 | Pilgrim | ................... 428/322.7 |
| 4,750,302 A | | 6/1988 | Bechtold | |
| 4,765,105 A | * | 8/1988 | Tissington et al. | ........ 52/309.11 |
| 4,931,031 A | * | 6/1990 | Lisiecki | ....................... 493/355 |
| 5,139,845 A | * | 8/1992 | Beckerman et al. | .......... 428/117 |
| 5,192,598 A | * | 3/1993 | Forte et al. | ..................... 428/71 |
| 5,281,456 A | * | 1/1994 | Botsolas | ..................... 428/40.6 |

(Continued)

FOREIGN PATENT DOCUMENTS

DE    33 28 354 A1    2/1985

(Continued)

OTHER PUBLICATIONS

European Search Report issued in EP07003881.5 on Aug. 3, 2007.

(Continued)

*Primary Examiner*—Brian E Glessner
*Assistant Examiner*—Benjamin Pevarski
(74) *Attorney, Agent, or Firm*—Baker Botts L.L.P.

(57) ABSTRACT

The invention relates to a process for sticking edging material (10, 12) onto lightweight building boards (1) comprising two thin-walled outer layers (2, 4) and a core layer (6) of lightweight filler material disposed between the outer layers (2, 4), having the steps: provision of a lightweight building board (1), a decor edge (10) and a stabilizing edge (12), and sticking on of the decor edge (10) and/or the stabilizing edge (12) in the region of a narrow surface (1') of the lightweight building board (1). The process according to the invention is characterized in that at least the stabilizing edge (12) comprises a synthetic fiber material, preferably a cellulose-based fiber material, particularly paperboard material.

20 Claims, 2 Drawing Sheets

U.S. PATENT DOCUMENTS

| | | | |
|---|---|---|---|
| 5,445,380 A * | 8/1995 | Polsky | 273/155 |
| 5,470,416 A | 11/1995 | Herring, Jr. et al. | |
| 5,700,586 A * | 12/1997 | Laiho et al. | 428/507 |
| 5,779,182 A * | 7/1998 | Raudaskoski | 242/541.4 |
| 5,849,131 A * | 12/1998 | Shaffer et al. | 156/285 |
| 5,885,685 A * | 3/1999 | Tingley | 428/105 |
| 6,221,521 B1 * | 4/2001 | Lynn et al. | 428/703 |
| 6,308,491 B1 | 10/2001 | Porter | |
| 6,405,509 B1 | 6/2002 | Razl | |
| 6,524,679 B2 * | 2/2003 | Hauber et al. | 428/68 |
| 6,777,063 B2 * | 8/2004 | Born | 428/167 |
| 6,854,230 B2 | 2/2005 | Starke | |
| 6,941,720 B2 * | 9/2005 | DeFord et al. | 52/783.14 |
| 7,254,894 B1 * | 8/2007 | Halpert | 33/1 B |
| 2002/0022560 A1 * | 2/2002 | Zoeckler et al. | 493/343 |
| 2002/0071937 A1 * | 6/2002 | Smith et al. | 428/182 |
| 2002/0090871 A1 * | 7/2002 | Ritchie et al. | 442/42 |
| 2003/0163972 A1 | 9/2003 | Angemendt et al. | |
| 2004/0187314 A1 * | 9/2004 | Johnson | 30/162 |

FOREIGN PATENT DOCUMENTS

| | | |
|---|---|---|
| EP | 0 580 067 | 1/1994 |
| EP | 0 580 067 A1 | 1/1994 |
| EP | 1 186 398 | 3/2002 |
| EP | 1 186 398 A | 3/2002 |
| EP | 1 563 970 | 8/2005 |
| EP | 1 563 970 A1 | 8/2005 |
| EP | 1 640 128 | 3/2006 |
| EP | 1 640 128 A | 3/2006 |

OTHER PUBLICATIONS

U.S. Appl. No. 12/037,463, filed Feb. 26, 2008.
U.S. Appl. No. 12/037,463, Non-Final Office Action dated Apr. 2, 2010.
U.S. Appl. No. 12/037,463, Response to Non-Final Office Action dated Jul. 2, 2010.
U.S. Appl. No. 12/037,463, Non-Final Office Action dated Sep. 9, 2010.

* cited by examiner

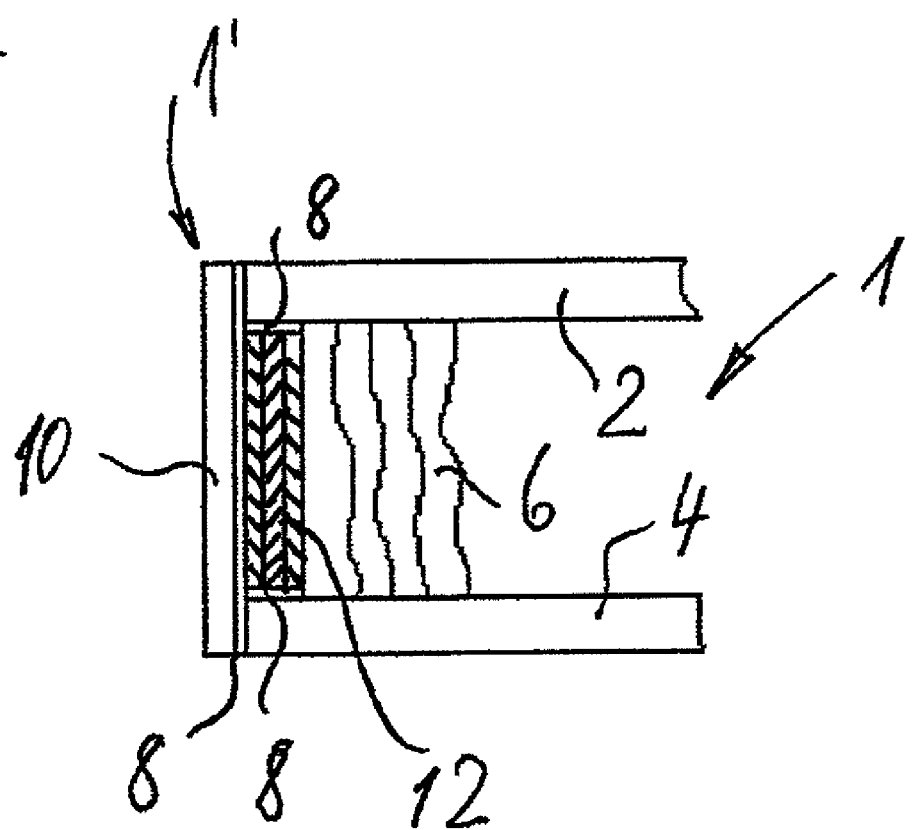

PROCESS FOR STICKING EDGING MATERIAL ONTO LIGHTWEIGHT BUILDING BOARDS AND A LIGHTWEIGHT BUILDING BOARD PRODUCED BY MEANS OF SAID PROCESS

CROSS-REFERENCE TO RELATED APPLICATIONS

The present application claims the benefit of EP Application No. 07 003 881.5, filed Feb. 26, 2007, which is hereby incorporated by reference in its entirety.

FIELD OF THE INVENTION

The invention relates to a process for sticking edging material onto lightweight building boards comprising two thin-walled outer layers and a core layer of lightweight filler material disposed between said outer layers according to the preamble of claim 1.

PRIOR ART

Lightweight building boards of the type discussed here have a broad range of applications, for the production of doors for example, but also increasingly for the production of table tops or other furniture components.

A process of the type referred to above is disclosed, for example, in EP-A-1640128. With this process, a lightweight building board is first formatted (made into the desired raw shape). Subsequently, a recess is milled in the region of the lightweight building board's narrow side, namely into both the outer layers and also into the core layer. Finally, a stabilizing edge, which is provided with or is still to be provided with a decor edge, is glued into the recess. Both the stabilizing edge and the decor edge are frequently made of a plastic material. In this regard it has been shown that it is difficult to deflect the stabilizing edge, which is usually thicker in execution, in the region of corners or curves of the lightweight building board's narrow side with the result that the board geometries that can be produced are limited or it is necessary to work with a plurality of separate stabilizing edge sections which leads to a complicated process sequence.

PRESENTATION OF THE INVENTION

The object of the invention is, therefore, to provide a generic process that enables a high level of flexibility in the board geometries that can be produced using a simple process sequence.

This object is achieved according to the invention by a process according to claim 1. Particularly preferred developments of the invention are specified in the dependent claims.

The invention is based on the concept of using a material for the stabilizing edge that enables very large deflection angles to the point of folding without unduly impairing the stabilizing edge's stabilizing properties. For this purpose, it is provided according to the invention that in a generic process the stabilizing edge at least comprises a synthetic fibre material. As the inventors have discovered, such a material is particularly suitable for the application under discussion here as the fibre composite of the synthetic fibre material permits extremely high deflection angles or even complete folding, whilst the material largely retains its rigidity perpendicular to the direction of deflection/folding, for example.

A possible explanation for this, although the present invention is not restricted hereto, may be seen in that during severe deformation there is no fracture in the synthetic fibre material used according to the invention but rather that the fibre composite is only partially broken with the result that the rigidity of the material perpendicular to the direction of deflection/folding is impaired relatively little and low restoring forces are generated.

Last but not least, the synthetic fibre material used according to the invention is available at low cost and is easy to process.

Within the scope of the present invention, "synthetic fibre material" is considered to be a material containing fibres and additives which have been processed together whereby both the fibres and also the additives may be of natural origin or may be produced artificially.

As the inventors have further discovered, the effects and advantages referred to above are particularly pronounced if, according to a further development of the invention, a cellulose-based fibre material, in particular paperboard material, is used for the stabilizing edge at least.

Within the scope of the present invention, the stabilizing edge may be provided in principle in any manner. With regard to flexible production and cost-effective handling of the edging material it has, however, proven advantageous according to a further development of the invention for the stabilizing edge at least to be cut off with a required width from a material web.

In this regard the material web may, for example, be laid out flat and the relevant stabilizing edge may be cut off using an appropriate tool such as a mobile cutting blade. According to a further development of the invention, it is, however, particularly preferred for the material web to be provided as a roll and for the stabilizing edge to be cut off from the material web roll as a part roll with a required width.

This method of proceeding brings with it a plurality of advantages. First of all the material web may be transported and stored in a space-saving manner. Furthermore, the part roll that has been cut off may also be disposed on a machine in a space-saving and efficient manner for carrying out the process according to the invention, for example on a roll holder, and the stabilizing edge material may be called off from the part roll continuously and in large quantities. Last but not least, provision of the material web as a roll has the advantage that such material web rolls are produced in large quantities in the paper and paperboard industry, for example, and are referred to there as "coils". Thus it is possible to access economical and easily available standard elements for the process according to the invention.

In this regard it should be noted that the provision of a material web as a roll and cutting off of the stabilizing edge from the material web roll as a part roll with the required width in combination with the preamble of claim 1 represents an independent purpose within the scope of the present invention which need not necessarily be combined with the characterising portion of claim 1.

Alternatively, it is equally possible within the scope of the present invention for the stabilizing edge to be cut off from the material web without it having been coiled up into a roll beforehand. In this regard, the stabilizing edge may, for example, be cut off from the material web immediately after the production of said web whereby it has proven particularly cost-effective if the stabilizing edge is cut off without waste or stock removal by means of a blade for example.

In addition, the present invention relates to a lightweight building board, which is produced using a process according to one of the preceding claims or according to the purpose referred to in the preceding paragraph.

BRIEF DESCRIPTION OF THE DRAWINGS

FIG. 3 shows a schematic representation of a partial sectional view of a material of the invention configured as a sandwich-like structure.

DETAILED DESCRIPTION OF PREFERRED EMBODIMENTS

Preferred embodiments of the present invention will be described in detail in the following with reference to the associated drawings.

Figure 1:
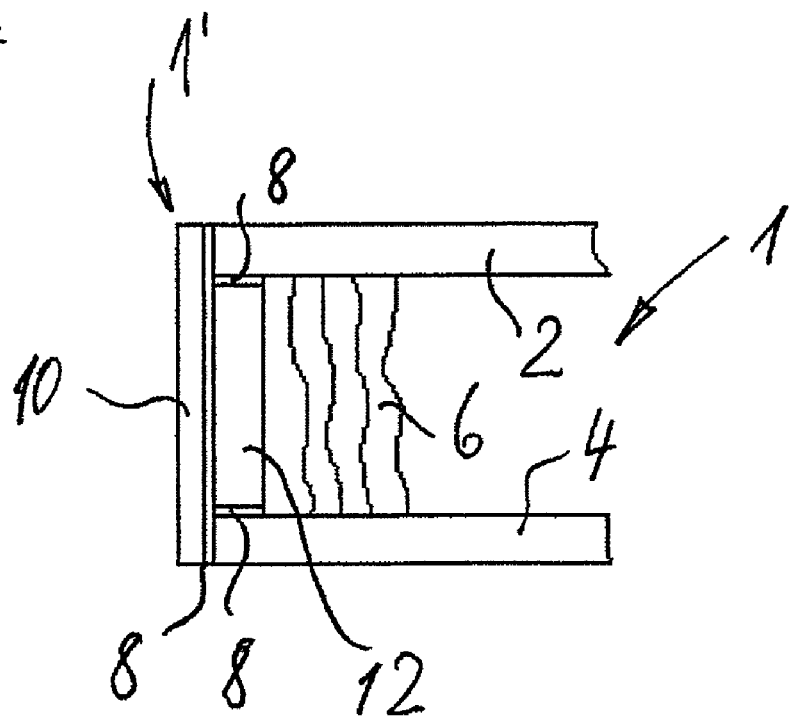
FIG. 1 shows a schematic representation of a partial sectional view of a lightweight building board according to the present invention.

Lightweight building board 1 shown schematically in FIG. 1 has, in the present embodiment, a top outer layer 2, a bottom outer layer 4 and a core layer 6 of lightweight filler material disposed there between. Although the present invention is not restricted to specific materials, thin-walled outer layers 2, 4 may be formed, for example, by a chipboard whilst core layer 6 may comprise a lightweight filler material, for example a foam, a paper honeycomb material or similar. In this regard, core layer 6 of lightweight filler material generally has a lower density (a lower weight per unit of volume) than respective outer layers 2 and 4.

In the region of a narrow surface 1' of lightweight building board 1, in the present embodiment a decor edge 10 and a stabilizing edge 12 are glued to outer layers 2, 4 by means of an adhesive 8.

The production of the lightweight building board shown in FIG. 1 takes place generally in such a manner that first of all a lightweight building board 1 is provided with a desired format (desired dimensions), for example by cutting lightweight building board 1 out of a large-format lightweight building board. Subsequently, decor edge 10 and stabilizing edge 12 are stuck on in the region of narrow surface 1' of lightweight building board 1 by means of adhesive 8. In this process step, the most diverse variations are conceivable, for example the introduction of a recess into outer layers 2, 4 and core layer 6 respectively for the introduction of stabilizing edge 12 into the region between outer layers 2, 4. In addition, it is, however, equally possible and advantageous according to the invention to sandwich stabilizing edge 12 in the region between outer layers 2, 4 without creating a recess and, if necessary, at this juncture to deform core layer 6. This results in a particularly simple process sequence.

In the present embodiment, stabilizing edge 12 consists of a paperboard material, i.e. of a cellulose-based fibre material with a weight per unit area in the range of 100 g/m² to 1,000 g/m². It must, however, be noted that within the scope of the present invention the stabilizing edge may, in addition to the synthetic fibre material, comprise at least one further material and a sandwich-like structure. In this regard, the at least one further material may likewise be a synthetic fibre material or another material such as plastic, wood or diverse other materials.

Figure 2:
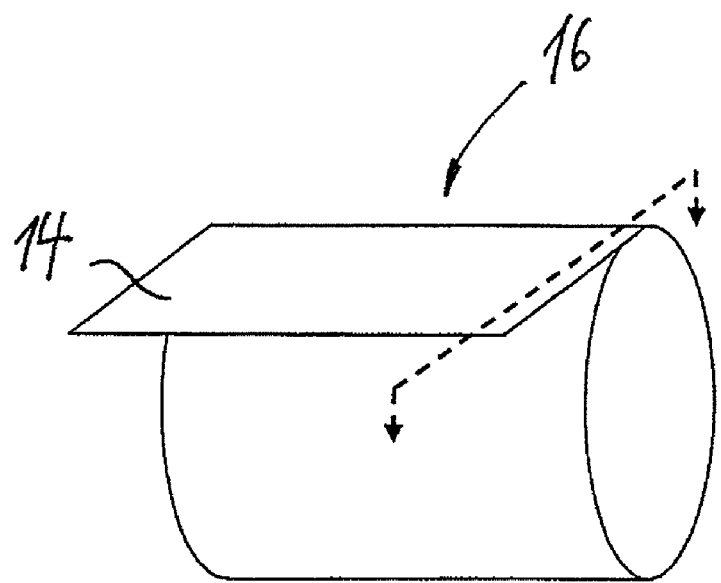
FIG. 2 shows a schematic representation of a perspective view of a material web provided as a roll.

In the present embodiment, the stabilizing edge, as illustrated in FIG. 2, is first cut off as a part roll with a required width from a material web 14, which is provided as a roll 16. Cutting off of the part roll is demonstrated in FIG. 2 by dotted arrows. This cutting process may be carried out in the most diverse manner, for example, by means of a blade, a knife or also by means of machining or other cutting devices, such as laser devices, etc. for example.

The part roll cut off may then be supplied in roll form to the process described above for introduction of the stabilizing edge into the region between outer layers 2, 4 or may also be easily stored and transported in this form.

The invention claimed is:

1. A process for adhering edging material onto lightweight building boards comprising two thin-walled outer layers and a core layer of lightweight filler material disposed between the outer layers comprising the steps:

providing a lightweight building board, a decor edge and a stabilizing edge, and introducing the stabilizing edge between the outer layers proximate a region of the narrow surface of the lightweight building board, introducing the decor edge proximate the region of the narrow surface of the lightweight building board, adhering the decor edge and/or the stabilizing edge to the region of the narrow surface of the lightweight building board, wherein at least the stabilizing edge comprises a paperboard material configured for deflection to large angles up to and including folding without unduly impairing the stabilizing properties of the stabilizing edge.

2. The process according to claim 1, wherein at least the stabilizing edge is cut off with a required width from a material web.

3. The process according to claim 2, wherein the material web is provided as a roll and the stabilizing edge is cut off as a part roll with a required width from the material web roll.

4. The process according to claim 2, wherein the stabilizing edge is cut from the material web without the web having been coiled up into a roll beforehand.

5. The process according to claim 1, wherein the stabilizing edge, in addition to the paperboard material, comprises at least one further material and has a sandwich-like structure.

6. The process according to claim 2, wherein the stabilizing edge, in addition to the paperboard material, comprises at least one further material and has a sandwich-like structure.

7. The process according to claim 3, wherein the stabilizing edge, in addition to the paperboard material, comprises at least one further material and has a sandwich-like structure.

8. The process according to claim 4, wherein the stabilizing edge, in addition to the paperboard material, comprises at least one further material and has a sandwich-like structure.

9. The process according to claim 5, wherein at least one further material is a synthetic fiber material or another material.

10. A lightweight building board which is produced by the process according to claim 1.

11. A lightweight building board which is produced by the process according to claim 2.

12. A lightweight building board which is produced by the process according to claim 3.

13. A lightweight building board which is produced by the process according to claim 4.

14. A lightweight building board which is produced by the process according to claim 5.

15. A lightweight building board which is produced by the process according to claim 6.

16. A lightweight building board which is produced by the process according to claim 7.

17. A lightweight building board which is produced by the process according to claim 8.

18. A lightweight building board which is produced by the process according to claim 9.

19. A process for attaching edging material onto lightweight building boards comprising:

providing a lightweight building board having a core member of lightweight filler material disposed between two outer layers;

introducing a stabilizing edge between the outer layers proximate a region of the narrow surface of the lightweight building board, introducing a decor edge proximate the region of the narrow surface of the lightweight building board, attaching the decor edge to the region of a narrow surface of the lightweight building board;

attaching the stabilizing edge to the region of a narrow surface of the lightweight building board, the stabilizing edge configured as a separate element from the two outer layers and comprised of a synthetic fiber material, the stabilizing edge configured for deflection to large angles up to and including folding without unduly impairing the stabilizing properties of the stabilizing edge.

20. The process according to claim 19, wherein the decor edge and the stabilizing edge are disposed in the region of the narrow surface with an adhesive.

* * * * *